United States Patent [19]

Chatterji

[11] 4,144,179

[45] Mar. 13, 1979

[54] COMPOSITION FOR TREATING LOW TEMPERATURE SUBTERRANEAN WELL FORMATIONS

[75] Inventor: Jiten Chatterji, Duncan, Okla.

[73] Assignee: Halliburton Company, Duncan, Okla.

[21] Appl. No.: 787,824

[22] Filed: Apr. 15, 1977

Related U.S. Application Data

[63] Continuation of Ser. No. 597,750, Jul. 21, 1975, abandoned, which is a continuation of Ser. No. 446,870, Feb. 28, 1974, abandoned.

[51] Int. Cl.² .................... E21B 43/26; E21B 43/22
[52] U.S. Cl. .................... 252/8.55 R; 106/194; 106/208; 166/308; 252/326; 536/88
[58] Field of Search .................... 166/283, 308; 252/8.55 R, 316; 536/88, 114; 106/194, 208

[56] References Cited

U.S. PATENT DOCUMENTS

| | | | |
|---|---|---|---|
| 2,512,338 | 6/1950 | Klug et al. | 536/99 X |
| 2,813,088 | 11/1957 | Meinel | 526/303 X |
| 3,167,510 | 1/1965 | Alter | 252/8.55 |
| 3,408,296 | 10/1968 | Kuhn et al. | 252/8.55 |
| 3,442,803 | 5/1969 | Hoover et al. | 252/8.55 |
| 3,483,121 | 12/1969 | Jordan | 252/8.55 |
| 3,719,663 | 3/1973 | Klug | 536/88 |
| 3,727,688 | 4/1973 | Clampitt | 166/283 |
| 3,818,991 | 6/1974 | Nimerick | 166/283 |
| 3,827,898 | 8/1974 | Podlas | 106/194 |

OTHER PUBLICATIONS

Pryor, Free Radicals, published by McGraw-Hill-Book Company, 1966, pp. 59, 60 and 136–140.

Primary Examiner—Herbert B. Guynn
Attorney, Agent, or Firm—Thomas R. Weaver; John H. Tregoning

[57] ABSTRACT

The present invention relates to a composition for treating low temperature subterranean formations using novel gelled aqueous compositions wherein the treating composition is introduced into the formation and maintained therein until the composition reverts to a thin fluid. The composition comprises an aqueous liquid, a water soluble organic gelling agent, a free radical generating agent, and a reducing agent.

24 Claims, No Drawings

COMPOSITION FOR TREATING LOW TEMPERATURE SUBTERRANEAN WELL FORMATIONS

This is a continuation of Application Ser. No. 597,750 filed July 21, 1975, now abandoned which is a continuation of Application Ser. No. 446,870, filed Feb. 28, 1974, now abandoned.

Gelled aqueous fluids have been developed and used extensively in the treatment of subterranean formations. For example, such fluids are commonly utilized as fracturing fluids for creating fractures in formations and for placing particulated solid propping agent therein. Following such treatments, the gelled fluid is caused to break or revert to a thin fluid so that it can either be pumped or produced back from the treated formation.

The breaking of aqueous gelled treating fluids has heretofore been accomplished using a variety of techniques such as by the degradative action of acids, enzymes or mild oxidizing agents. However, the use of prior gelled compositions and techniques for causing the compositions to revert to thin fluids has been limited to operating temperatures greater than about 120° F. That is, the use of gelled aqueous solutions in subterranean well formations existing at temperatures below about 120° F. has heretofore been severely restricted due to the lack of effective techniques for breaking such gels at temperatures below about 120° F.

By the present invention gelled aqueous compositions and methods of using such compositions for treating subterranean formations below 120° F. are provided. The gelled compositions of this invention readily break or revert to thin fluids at temperatures as low as 70° F and are particularly suitable as treating fluids for fracturing and propping low temperature formations.

Broadly described, the novel gelled aqueous compositions of the present invention are comprised of an aqueous liquid, a water soluble organic gelling agent, a water soluble free radical generating agent for generating free radicals to degrade the gelling agent, and a water soluble reducing agent for accelerating the generation of free radicals at low temperatures.

Suitable aqueous liquids are the aqueous liquids commonly used for treating subterranean formations. Of these aqueous liquids, potable water is preferred because it does not contain dissolved salts which can interfere with the formation of viscous gels with water soluble organic gelling agents. However, brine produced from subterranean formations and sea water are often available for treating subterranean formations and form viscous gels with water soluble organic gelling agents. It has also been found desirable to include certain salts such as potassium and sodium chloride in the gelled aqueous compositions to prevent the composition from swelling clay or damaging shale contained in subterranean formations. In other gelled aqueous compositions it has been found desirable to mix the aqueous liquid with lower alkyl alcohols such as methanol, ethanol or isopropanol. The use of salts and alcohol, as well as other additives for the gelled aqueous composition, are often desirable and are useful when they do not interfere with the formation of viscous gels when water soluble organic gelling agents are mixed with aqueous liquids containing these materials.

Water soluble organic gelling agents which readily form viscous gels with aqueous liquids and which are suitable for use in accordance with the present invention are water soluble synthetic polymers, water soluble derivatives of cellulose, water soluble polysaccharides, water soluble derivatives of polysaccharide, and mixtures of the foregoing compounds.

Examples of suitable water soluble synthetic polymers include, but are not limited to, polymethacrylamide, polyacrylamide, sodium polyacrylate, polyacrylic acid and polysodium-2-acrylamide-3-propylsulfonate. Particularly preferred such polymers are polyacrylamides and polymethacrylamides which have been hydrolyzed such that from about 0 to about 70 percent of the amide groups have been converted to carboxyl groups and then neutralized with ammonium or an alkali metal hydroxide. The most preferred water soluble synthetic polymer for use as a gelling agent in accordance with the present invention is a polyacrylamide polymer which has been hydrolyzed such that about 0 to 30 percent of the amide groups have been converted to carboxyl groups and the carboxyl groups neutralized with an alkali metal or ammonium hydroxide.

Water soluble derivatives of cellulose suitable for use as gelling agents in accordance with the present invention include, but are not limited to, hydroxyethylcellulose, carboxymethylhydroxyethylcellulose, carboxymethylcellulose, methylcellulose, ethylcellulose, propylcellulose and sulfopropylcellulose. Of these, hydroxyethylcellulose and carboxymethylhydroxyethylcellulose are preferred.

Suitable water soluble polysaccharides are guar gum, locust bean gum, and gum tragacanth. Water soluble derivatives of the foregoing polysaccharide compounds can also be utilized as gelling agents, e.g., hydroxyethyl guar gum, hydroxypropyl guar gum and carboxymethyl guar gum. Of the various polysaccharides which can be used, guar gum is preferred.

The preferred gelling agents mentioned above, i.e., polyacrylamide polymers which have been hydrolyzed and neutralized, hydroxyethylcellulose, carboxymethylhydroxyethylcellulose and guar gum are readily commercially available and form stable gels of desired viscosity when added to aqueous liquids at relatively low concentrations.

Gelling agent concentrations of about 0.1 to about 10 parts by weight gelling agent per 100 parts by weight aqueous liquid are generally required. At concentrations below about 0.1 part by weight gelling agent per 100 parts by weight aqueous liquid, the resulting gel does not have sufficient viscosity to achieve desired objectives, e.g., to adequately maintain propping agents in suspension. At concentrations above about 10 parts by weight gelling agent per 100 parts by weight aqueous liquid, the resulting composition is generally of such a high viscosity that excessive friction losses are encountered when displacing the composition through a conduit at high velocities. When using the preferred gelling agents mentioned above, they are preferably added to the aqueous liquid in an amount of about 0.25 to about 1.5 parts by weight gelling agent per 100 parts by weight aqueous liquid.

The free radical generating agents useful in accordance with the present invention are water soluble oxidizing agents having the property of generating free radicals for degrading the gelling agent. Such oxidizing agents include water soluble peroxide compounds, persulfate compounds, or mixtures thereof. Examples of preferred and particularly suitable water soluble peroxide compounds include, but are not limited to, hydrogen peroxide, tertiary butyl hydroperoxide and ditertiary butyl peroxide. Preferred water soluble persulfates include ammonium persulfate and the alkali metal persulfates.

The foregoing free radical generating agents are utilized in the compositions of the present invention in an amount of about 0.0001 to about 2 parts by weight free radical generator per 100 parts by weight aqueous liquid. At a concentration below about 0.0001 part free radical generator per 100 parts aqueous liquid, the rate of degradation of the gelling agent is low and the time required for breaking the gel is generally too long. Above a concentration of about 2 parts by weight free radical generator per 100 parts by weight aqueous liquid, excess free radicals are generated. When utilizing the preferred free radical generating agents mentioned above, they are combined with the aqueous liquid and gelling agent in an amount of about 0.001 to about 0.75 parts by weight free radical generator per 100 parts by weight aqueous liquid.

Reducing agents which are suitable for use in accordance with the present invention and which function to accelerate the generation of free radicals over an extended period of time at low temperatures are water soluble metal salts wherein the oxidation number of the metal ion is less than the highest possible oxidation number for that ion. Examples of such salts are the cuprous, ferrous, stannous, cobaltous, chromous, nickelous, titanous, manganous and arsenous salts of the halides, sulfates and nitrates. Of these, cuprous chloride, ferrous chloride and cobaltous chloride are preferred in that they have a limited solubility in aqueous fluids, and as a result the aqueous treating compositions of the present invention including these salts remain gelled for periods of time long enough to place and utilize the compositions in subterranean well formations. That is, the reducing agent dissolves slowly so that the reactivity of the free radical generating agent is not accelerated too quickly. The metal salt used is preferably included in the treating composition in an amount at least equal to the amount required to stoichiometrically react with the free radical generating agent present in the composition. This concentration is generally about 0.1 to about 7.5 parts by weight metal salt per 100 parts by weight aqueous liquid.

While the novel gelled aqueous compositions of the present invention have a variety of uses in treating low temperature subterranean well formations, the compositions are particularly suitable as fracturing fluids. That is, the gelled aqueous compositions can be formed with a viscosity sufficient to bring about the fracturing of a well formation using conventional techniques. Further, the gelled aqueous composition are able to maintain solid particulated propping agents in suspension so that the propping agent can be placed in the fractures thereby preventing them from closing.

In carrying out the methods of the present invention for treating a low temperature subterranean formation penetrated by a well bore, an aqueous gelled composition of the present invention can be prepared on the surface by mixing the gelling agent and the reducing agent with a quantity of aqueous liquid at atmospheric temperatures. The free radical generating agent is then added to the aqueous liquid and the resulting gelled aqueous composition is introduced into the formation, usually by pumping the gelled aqueous composition through a string of pipe disposed in the well bore. Once the treatment of the formation is completed, a sufficient time period is allowed for the gelled aqueous composition to break of revert to a thin fluid. As stated previously, even at well formations existing at temperatures as low as 70° F., only a relatively short period of time is required for the gelled aqueous compositions to break. Once broken, the aqueous liquid returns to the well bore, along with fluids produced from the subterranean formation.

In fracturing a low temperature subterranean formation according to the method of the present invention, a gelled aqueous composition of the invention can be prepared with a quantity of solid particulated propping agent suspended therein. In preparing the composition, the propping agent is preferably added to a quantity of aqueous liquid prior to or simultaneously with the gelling agent and reducing agent and the mixture vigorously agitated to form the gel with propping agent uniformly distributed therein. The free radical generating agent is added to the composition while being agitated, and the composition is then introduced into the formation and forced into fractures created herein so that the propping agent is placed in the fractures. After the propping agent has been placed, the composition is allowed to revert to a thin fluid and recovered leaving the propping agent in the fractures so that they are held open. As will be understood by those skilled in the art, the recovery of the treating composition can be accomplished in a variety of ways, but generally simply involves placing the treated well formation on production so that the fluids are produced back along with natural fluids from the formation.

In order to present a clear understanding of the present invention the following examples are given:

EXAMPLE 1

A gelled aqueous composition is prepared in the laboratory by dissolving a mixture of 4.8 grams (the equivalent of 80 pounds per 1000 gallons) of guar gum and 0.3 grams of ferrous sulfate in 500 milliliters of tap water. A highly viscous aqueous composition is formed at a temperature of 70° F. 0.3 grams of potassium persulfate are then added to the aqueous composition and the mixture is vigorously agitated with the result that the composition reverts to a thin fluid having a viscosity of less than 2 centipoises.

EXAMPLE 2

A gelled aqueous composition is prepared in the laboratory by dissolving 4.8 grams of hydroxyethylcellulose and 0.3 grams of ferrous sulfate in 500 milliliters of tap water. A highly viscous aqueous composition is formed at a temperature of 70° F. 0.3 grams of potassium persulfate are added to the composition and upon vigorous agitation the composition reverts to a thin fluid having a low viscosity.

EXAMPLE 3

A polyacrylamide polymer mixture, hydrolyzed such that from about 0 to about 30 percent of the amide groups are converted to carboxyl groups and then neutralized with sodium hydroxide, is added to 500 milliliters of tap water in an amount of 4.8 grams, along with 0.3 grams of ferrous sulfate. A gelled aqueous composition at a temperature of 70° F is formed. 0.3 grams of potassium persulfate are added to the aqueous composition and after vigorous agitation the composition reverts to a thin fluid having a viscosity of less than 2 centipoises.

While the gelled aqueous compositions of the present invention are particularly suitable for carrying out fracturing and fracture propping operations in low temperature subterranean well formations, the compositions are not so limited in that they can be utilized for carrying out numerous other operations. As will be understood by those skilled in the art, many variations, both as to methods of utilizing the compositions and in the relative proportions of components of the compositions can be made without departing from the scope of this invention. Furthermore, additional components and/or additives can be incorporated with the compositions to bring about desired properties such as the reduction of fluid loss, etc. The invention should be limited only by the lawful scope of the appended claims.

What is claimed is:

1. An aqueous composition for treating subterranean formations having temperatures of up to about 120° F. consisting essentially of:
    an aqueous liquid, a water soluble organic gelling agent present in said aqueous liquid in an amount sufficient to increase the viscosity thereof, a water soluble oxidizing agent having the property of generating free radicals, and a water soluble reducing agent to accelerate the generation of said free radicals;
    wherein said reducing agent is a water soluble metal salt, selected from the group consisting of cuprous, ferrous, stannous, cobaltous, chromous, nickelous, titanous, manganous and arsenous salts of the halides, sulfates and nitrates and mixtures thereof; and said reducing agent is present in said composition in an amount in the range of from about 0.1 to about 7.5 parts by weight per 100 parts by weight aqueous liquid; and
    wherein said oxidizing agent is selected from the group consisting of water soluble peroxide compounds, water soluble persulfate compounds and mixtures thereof and said oxidizing agent is present in an amount of about 0.001 to about 2 parts by weight free radical generating agent per 100 parts by weight aqueous liquid; and further
    wherein said organic gelling agent is selected from the group consisting of guar gum, locust bean gum, gum tragacanth, hydroxyethyl guar gum, hydroxypropyl guar gum, carboxymethyl guar gum and mixtures thereof.

2. The composition of claim 1 further defined to include a propping agent.

3. The composition of claim 1 wherein said gelling agent is present in an amount of about 0.1 to about 10 parts by weight gelling agent per 100 parts by weight aqueous liquid.

4. The composition of claim 3 wherein said oxidizing agent is selected from the group consisting of hydrogen peroxide, tertiary butyl hydroperoxide, di-tertiary butyl peroxide, ammonium persulfate, an alkali metal persulfate, and mixtures thereof.

5. The composition of claim 4 wherein said reducing agent is selected from the group consisting of cuprous chloride, ferrous chloride, cobaltous chloride, and mixtures thereof.

6. The composition of claim 5 wherein said oxidizing agent is present in an amount of about 0.001 to about 0.75 parts by weight per 100 parts by weight aqueous liquid.

7. The composition of claim 6 wherein said gelling agent is guar gum present in said composition in an amount of about 0.25 to about 1.5 parts by weight guar gum per 100 parts by weight aqueous liquid.

8. The composition of claim 3 wherein said gelling agent is selected from the group consisting of guar gum, locust bean gum, gum tragacanth, and mixtures thereof.

9. The composition of claim 3 wherein said gelling agent is selected from the group consisting of hydroxyethyl guar gum, hydroxypropyl guar gum, carboxymethyl guar gum and mixtures thereof.

10. The composition of claim 3 wherein said oxidizing agent is a water soluble peroxide selected from the group consisting of hydrogen peroxide, tertiary butyl hydroperoxide, di-tertiary butyl peroxide, and mixtures thereof, said water soluble peroxide compound being present in said composition in an amount of about 0.001 to about 0.75 parts by weight peroxide compound per 100 parts by weight aqueous liquid.

11. The composition of claim 3 wherein said oxidizing agent is a water soluble persulfate selected from the group consisting of ammonium persulfate, alkali metal persulfates, and mixtures thereof, said water soluble persulfate compound being present in said composition in an amount of about 0.001 to about 0.75 parts by weight persulfate compound per 100 parts by weight aqueous liquid.

12. The composition of claim 3 wherein the reducing agent is selected from the group consisting of cuprous chloride, ferrous chloride, cobaltous chloride, and mixtures thereof.

13. A method for reducing the viscosity of an aqueous gelled composition, said method consisting essentially of:
    preparing an aqueous gelled composition by mixing a water soluble gelling agent and a water soluble reducing agent with an aqueous liquid, said gelling agent being present in an amount to increase the viscosity of the aqueous liquid to a desired level,
    mixing with said aqueous gelled composition a water soluble oxidizing agent having the property of generating free radicals, and
    subjecting said aqueous gelled composition containing said oxidizing agent and said reducing agent to temperatures of up to about 120° F. for a time sufficient to reduce the viscosity of said aqueous gel;
    wherein said reducing agent accelerates the generation of said free radicals and is a water soluble metal salt, selected from the group consisting of cuprous, ferrous, stannous, cobaltous, chromous, nickelous, titanous, manganous and arsenous salts of the halides, sulfates and nitrates and mixtures thereof; and said reducing agent is present in said composition in an amount in the range of from about 0.1 to about 7.5 parts by weight per 100 parts by weight aqueous liquid; and
    wherein said oxidizing agent is selected from the group consisting of water soluble peroxide compounds, water soluble persulfate compounds and mixtures thereof and said oxidizing agent is present in an amount of about 0.0001 to about 2 parts by weight free radical generating agent per 100 parts by weight aqueous liquid; and
    wherein said organic gelling agent is selected from the group consisting of sodium polyacrylate, polyacrylic acid, polysodium-2-acrylamide-3-propylsulfonate, polyacrylamides and polymethacrylamides hydrolyzed to convert from 0 to about 70 percent of amide groups to carboxyl groups which are then neutralized with ammonium or an alkali metal hydroxide; guar gum, locust bean gum, gum tragacanth, hydroxyethyl guar gum, hydroxypropyl guar gum, carboxymethyl guar gum and mixtures thereof.

14. The method of claim 13 wherein said aqueous gelled composition contains a propping agent.

15. The method of claim 13 wherein said gelling agent is present in an amount of about 0.1 to about 10 parts by weight gelling agent per 100 parts by weight aqueous liquid.

16. The method of claim 15 wherein said oxidizing agent is selected from the group consisting of hydrogen peroxide, tertiary butyl hydroperoxide, di-tertiary butyl peroxide, ammonium persulfate, an alkali metal persulfate, and mixtures thereof.

17. The method of claim 16 wherein said reducing agent is selected from the group consisting of cuprous chloride, ferrous chloride, cobaltous chloride, and mixtures thereof.

18. The method of claim 17 wherein said oxidizing agent is present in an amount of about 0.001 to about 0.75 parts by weight per 100 parts by weight aqueous liquid.

19. The method of claim 18 wherein said gelling agent is polyacrylamide which has been hydrolyzed such that from about 0 to about 30 percent of the amide groups have been converted to carboxyl groups and then neutralized with an ammonium or alkali metal hydroxide, said polyacrylamide being present in said composition in an amount of about 0.25 to about 1.5 parts by weight gelling agent per 100 parts by weight aqueous liquid.

20. The method of claim 18 wherein said gelling agent is guar gum present in said composition in an amount of about 0.25 to about 1.5 parts by weight guar gum per 100 parts by weight aqueous liquid.

21. The method of claim 15 wherein said gelling agent is selected from the group consisting of polyacrylamide, which has been hydrolyzed such that from about 0 to about 30 percent of the amide groups have been converted to carboxyl groups and then neutralized with an ammonium or alkali metal hydroxide.

22. The method of claim 15 wherein said oxidizing agent is a water soluble peroxide selected from the group consisting of hydrogen peroxide, tertiary butyl hydroperoxide, di-tertiary butyl peroxide, and mixtures thereof, said water soluble peroxide compound being present in said composition in an amount of about 0.001 to about 0.75 parts by weight peroxide compound per 100 parts by weight aqueous liquid.

23. The method of claim 15 wherein said oxidizing agent is a water soluble persulfate selected from the group consisting of ammonium persulfate, alkali metal persulfates, and mixtures thereof, said water soluble persulfate compound being present in said composition in an amount of about 0.001 to about 0.75 parts by weight persulfate compound per 100 parts by weight aqueous liquid.

24. The method of claim 15 wherein the reducing agent is selected from the group consisting of cuprous chloride, ferrous chloride, cobaltous chloride, and mixtures thereof.

* * * * *

UNITED STATES PATENT AND TRADEMARK OFFICE
CERTIFICATE OF CORRECTION

PATENT NO. : 4,144,179
DATED : March 13, 1979
INVENTOR(S) : JITEN CHATTERJI

It is certified that error appears in the above-identified patent and that said Letters Patent are hereby corrected as shown below:

In Column 4, at line 20, delete the word "herein" and insert therefor --therein--.

In Claim 1, at Column 5, line 40, delete "0.001" and insert therefor --0.0001--.

Signed and Sealed this

Twenty-fourth Day of July 1979

[SEAL]

Attest:

Attesting Officer

LUTRELLE F. PARKER
Acting Commissioner of Patents and Trademarks